J. A. MOSQUERA.
COFFEE-SHELLER.

No. 176,236.  Patented April 18, 1876.

WITNESSES:
Chas. Nida
John Goethals

INVENTOR:
J. A. Mosquera
BY
ATTORNEYS.

UNITED STATES PATENT OFFICE.

JOSÉ A. MOSQUERA, OF CARACAS, VENEZUELA.

IMPROVEMENT IN COFFEE-SHELLERS.

Specification forming part of Letters Patent No. 176,236, dated April 18, 1876; application filed March 21, 1876.

*To all whom it may concern:*

Figure 1:
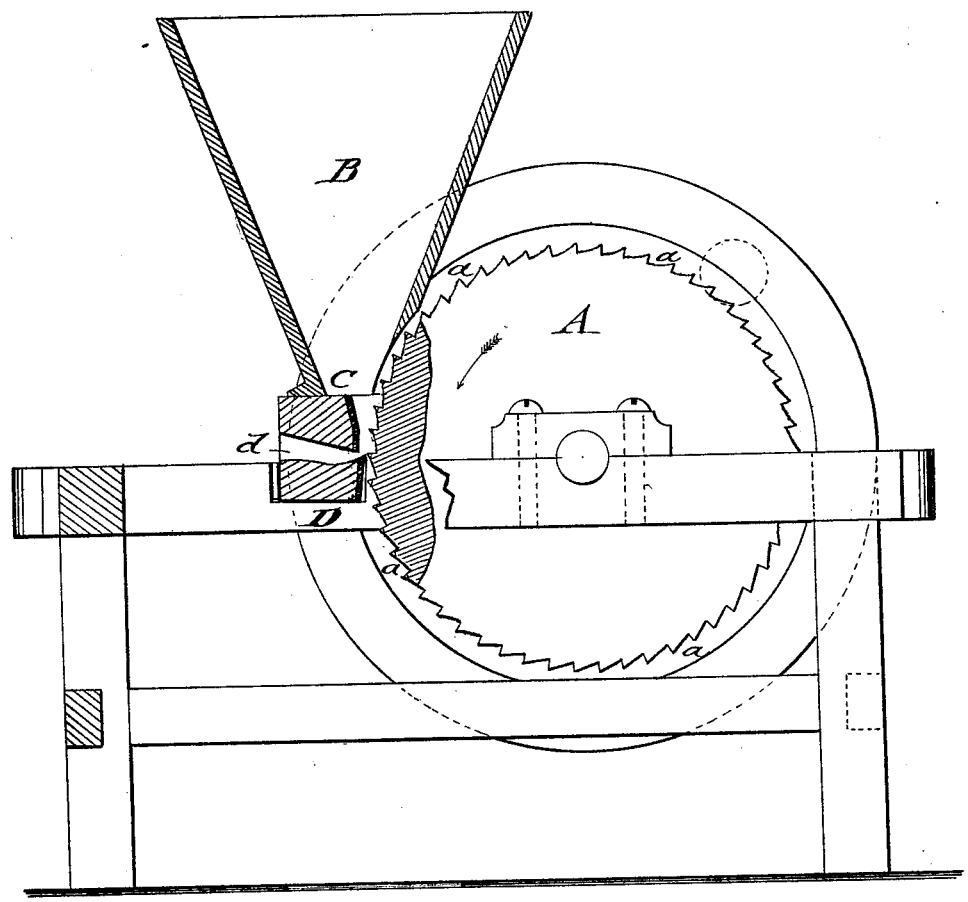
Figure 2:
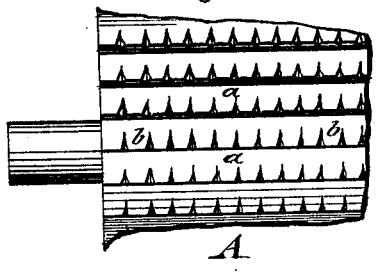

Be it known that I, JOSÉ A. MOSQUERA, of Caracas, Venezuela, have invented a new and Improved Coffee-Shelling Machine, of which the following is a specification:

Figure 1 represents a sectional side elevation of my improved coffee-shelling machine, and Fig. 2 a detail top view of the shelling-cylinder.

Similar letters of reference indicate corresponding parts.

My invention relates to an improved machine for shelling coffee in a rapid and perfect manner, so that the beans are freed from the shells or pods without being crushed or broken; and the invention consists of a grooved and notched revolving cylinder that breaks the shells in connection with suitable knives.

In the drawing, A represents a shelling-cylinder, made of iron or other suitable material, and revolved at suitable speed by steam or other power. The cylinder A is provided with longitudinal concaved grooves $a$, that are of about the width of a coffee-berry, and form teeth into which notches $b$ are cut transversely to the grooves. The berries are fed to the cylinder by a hopper, B, of suitable shape, and carried by the grooves and notches of the cylinder against the breaking or shelling knives C. A second knife, D, is placed below the breaking-knife and nearer to the circumference of the cylinder to separate the beans from the shells by the action of the cylinder thereon. The broken shells are carried by the grooves and notches of the cylinder past the separating-knife D, while the soft and elastic beans escape through a channel, $a$, between the upper and lower knives.

The machine produces the rapid and effective shelling of the coffee-berries without injuring or crushing the beans, so as to form a superior machine as compared with the crudely-constructed machines for the same purpose.

Having thus described my invention, I claim as new and desire to secure by Letters Patent—

A coffee-shelling machine composed of a grooved and notched revolving cylinder, in combination with breaking and separating knives, of which the lower separating-knife is placed nearer to the cylinder than the upper breaking-knife, substantially as specified.

JOSÉ A. MOSQUERA.

Witnesses:
 PAUL GOEPEL,
 T. B. MOSHER.